United States Patent Office 2,758,933
Patented Aug. 14, 1956

2,758,933

TREATMENT OF EGGS

Bernard M. Shaffer, Chicago, Ill., assignor, by mesne assignments, to Ben L. Sarett, Chicago, Ill.

No Drawing. Application July 29, 1953,
Serial No. 371,177

12 Claims. (Cl. 99—210)

My invention relates to the treatment of liquid egg products, especially liquid egg whites, and is concerned particularly with the preparation of dried egg whites having superior qualities and characteristics, notably in relation to their over-all beating or whipping and baking properties.

The processing of liquid egg products in order to produce dried products having satisfactory characteristics with respect to color, odor, keeping properties, whipping characteristics, sugar retention, and performance in such finished products as cakes, meringues, confections, and the like involves complex physico-chemical phenomena. Numerous procedures having as their objectives the production of superior dried egg products have heretofore been suggested. While such processes have brought about certain improvements, much was left to be desired.

It has heretofore been proposed to prepare dried egg products by a procedure comprising subjecting liquid egg products, particularly liquid egg whites, to an oxidation or oxygenation treatment in the presence of a glucose oxidase, or a glucose oxidase and catalase, for a period of time sufficient to effect certain changes, evidenced by a substantial reduction in the content of the free reducing sugars normally present in the liquid egg materials, after which the thus treated liquid egg materials are dried. Such procedures, while producing significant improvements in previously known processes, nevertheless have failed to present a solution to certain problems which have continued to vex producers of dried egg products.

If a liquid egg white, for instance, is subjected to treatment with glucose oxidase and catalase in the presence of hydrogen peroxide over a period of about 5 to 6 hours, at a temperature in the range of about 70–95 degrees F., preferably 80–85 degrees F., in accordance with heretofore known practices, and thereupon pan dried, the resulting dried egg white, when mixed with sucrose in a ratio of 1 part of dried egg white solids to 2 parts of sucrose, by weight, requires about 7 to 9 minutes of whipping or beating time to reach a stiff peak foam stage. If such a dried egg white is allowed to age for a period of time, for instance, of the order of several weeks to months, the beating time to reach a stiff peak tends to improve. However, such an aging procedure is undesirable from a number of standpoints among which is the fact that storage and equipment costs are increased and such procedure is, therefore, commercially impracticable. The beating or whipping time to reach a stiff peak foam stage may be determined in a variety of ways. The times here mentioned were based upon a procedure involving admixing 108 grams of a mixture containing ⅓ dried egg whites and ⅔ sucrose with 270 ml. water, initially mixing the same for 2 minutes at low speed in a "Sunbeam Mixmaster," and then mixing at high speed until a stiff peak foam is obtained. The time of mixing at high speed to obtain a stiff peak foam is taken as the measure of the time to reach a stiff peak.

When dried egg products made by glucose oxidase-catalase treatments are incorporated into dried or prepared cake mixes, reasonably satisfactory results are obtained, but the stability or shelf life of such mixes is not all that may be desired. The baking characteristics of said glucose oxidase-catalase treated egg whites, particularly in high sugar content cakes, are also somewhat deficient.

I have discovered that the beating or whipping properties as well as the baking properties of the glucose oxidase-catalase treated egg product, particularly egg whites, are notably improved by the incorporation of substantial quantities of certain aliphatic polyhydric alcohols into the glucose oxidase-catalase treated egg liquids, all as is described in detail below.

The term "aliphatic polyhydric alcohol," as used herein, is intended to encompass only those aliphatic polyhydric alcohols which are water-soluble, and which are free of aldehyde or ketone groups reactive with egg albumen to cause deterioration or adverse effect upon the egg albumen when used under the conditions encompassed by the present invention. Typical examples of such aliphatic polyhydric alcohols are glycerin; glycols such as propylene glycol; polyglycerols such as diglycerol, triglycerol, tetraglycerol and higher polyglycerols and mixtures thereof; sugar alcohols or hexitols such as mannitol, sorbitol, arabitol and dulcitol; mannose; maltose; and the like, as well as mixtures of any two or more thereof. Where the egg products are to be used for edible purposes, which will usually be the case, the aliphatic polyhydric alcohols utilized should, of course, be non-toxic. Especially satisfactory are glycerin and sorbitol and their use represents particularly important embodiments of my invention.

The invention is particularly useful in the production of dried egg whites or albumen from said glucose oxidase-catalase treated liquid egg whites. The resulting dried egg white or albumen is particularly advantageous for the production of angel food cakes or angel food prepared cake mixes but it can, of course, be employed with excellent results in the production of other foods, baked goods and the like, such as meringues, candies and other confections, in which egg albumen is conventionally utilized.

The amount of aliphatic polyhydric alcohol added to the glucose oxidase-catalase treated egg liquids, especially egg whites, is somewhat variable but, in all cases, is such that, when the finished egg white product is dried, said dried product is in the form of dry-to-the-touch generally free flowing powders, granules or similar pulverulent materials, depending, for instance, on the exact drying procedures utilized. In general, the content of the aliphatic polyhydric alcohol, subject to the criterion set forth above, will range from about 4% to about 22%, by weight, of the finished dried egg product, with a particularly preferred range being from about 6% to 10%. In the case of certain aliphatic polyhydric alcohols, such as propylene glycol, quantities substantially less than 22% should be used since the larger proportions have an adverse effect on the egg proteins when the liquid egg materials are dried. The finished dried egg products may contain from a few per cent up to 10% or 12% or more of moisture, depending upon the exact method and conditions of drying utilized.

The final dried egg white products, in their preferred embodiments, are characterized by exceptionally satisfactory properties in relation to odor, whip, sugar-carrying capacity, and freedom from discoloration on aging. They possesss good solubility in water and, when used in the baking of cakes, produce cakes of excellent texture, color and volume. The resulting cakes are, moreover, characterized by especially good color stability and volume retention on cooling after baking. Prepared cake mixes made, for instance, with the dried egg white products of my invention have outstanding stability or shelf life in comparison with such cake mixes prepared with heretofore known dried egg white products.

It should be understood that I do not claim any patentable novelty in the broad concept of producing a liquid egg white product or a dried egg white product having a content of glycerin therein. Such products have heretofore been disclosed as is shown, for example, in such U. S. patents as Nos. 1,924,990 and 2,176,078, and such foreign patents as British Nos. 314,887 and 570,268. None of these patents nor any other publications of which I am aware discloses or suggests the production, for instance, of glucose oxidase-catalase treated egg white products, in the form of a powder or granular mass, containing glycerin or other aliphatic polyhydric alcohols in the range of about 4% to about 22%, by weight. None of the heretofore known egg white products, of the type shown in the patents mentioned in this paragraph, is capable of achieving the results obtained by the use of the dried egg white products produced in accordance with my present invention when employed in the baking of cakes, notably high-sugar cakes.

In the practice of my invention, the liquid egg whites, which, for example, may be fresh liquid egg whites or frozen and thawed liquid egg whites, are subjected to treatment with glucose oxidase or glucose oxidase and catalase in the presence of an oxidizing agent, particularly hydrogen peroxide. The treatment is carried out for a period of time sufficient to effect a reduction of at least 50% of the content of free reducing sugars present in the liquid egg material and, more particularly, to decrease the content of free reducing sugars at the end of the processing to in the range of about 0.01% to 0.03% and, better still, to not over 0.01%, by weight, based on the weight of the liquid egg material. On the dried egg basis, say dried egg whites, this latter figure represents about 0.1% of free reducing sugars. Upon completion of such treatment, glycerin, sorbitol or other aliphatic polyhydric alcohol is added to the liquid egg whites in amounts of the order stated above and the mixture is thereupon dried in any suitable manner as, for instance, by known pan drying, belt drying, foam drying, or spray drying procedures.

The following examples are illustrative of the practice of my invention. It will be understood that various changes may be made, within the spirit and scope of my teachings, as, for example, in the selection of glucose oxidase and catalase preparations, in the proportions thereof utilized, in the preliminary treatment accorded the liquid egg white products, and the like. The examples are, therefore, not to be construed in any way as limitative of the scope of my invention. The particular glucose oxidase employed was a commercial product sold under the name "Deoxygenase" which contained glucose oxidase and catalase.

*Example 1*

To 1000 ml. of liquid egg whites, previously neutralized with lactic acid to pH 7, there is added, with constant stirring, 2.5 ml. of 30% hydrogen peroxide and 5 ml. of the glucose oxidase-catalase preparation. Three further additions, in each case of 2.0 ml. of 30% hydrogen peroxide, are made at 15 minute intervals. At the end of 2 hours the free reducing sugar content is 0.18 mg./ml. and at the end of 4 hours the free reducing sugar content is 0.09 mg./ml. Thereupon, to the resulting liquid egg product 10 grams of glycerin are added and the mixture is promptly pan dried.

*Example 2*

To 50 pounds of liquid egg whites having a pH of about 9, a sufficient amount of lactic acid is added to bring the pH down to 7. Thereupon, 60 ml. of 30% hydrogen peroxide are added followed by the addition of 120 ml. of the glucose oxidase-catalase preparation. Three further additions of 40 ml. portions of hydrogen peroxide are made at 20 minute intervals. The temperature is maintained at 78 to 81 degrees F. At the end of 6 hours, the free reducing sugar is about 0.03%. To the resulting liquid egg product, 0.75 pound of glycerin is added and the mixture is thereupon pan dried.

*Example 3*

This example is carried out in exactly the manner described in Example 2 except that sorbitol is substituted for the glycerin.

*Example 4*

To 100 pounds of liquid egg whites, previously neutralized to a pH of 7 by the addition of lactic acid, there is added, with stirring, an aqueous solution prepared by eluting the glucose oxidase and catalase from 0.1 pound of a powdered "Deoxygenase" preparation (containing, adsorbed on a carrier, 1500 glucose oxidase units per gram of said preparation and sufficient catalase to liberate oxygen from the amount of hydrogen peroxide necessary for the desired reaction). Then 5 ounces of 35% hydrogen peroxide is added gradually over a period of 1 hour, and then 5 more ounces of 35% hydrogen peroxide is added gradually over a period of 4 hours, the mixture being stirred continuously or from time to time. Promptly upon the completion of the approximately 5 hour period, 1.25 pounds of glycerin is added and the mixture is dried, by pan or spray drying.

My invention is especially applicable to the treatment of liquid egg whites for the production of dried egg albumen. In its broader aspects, however, my teachings can be used with advantage, for producing exceptionally satisfactory products, in connection with the treatment of whole eggs, egg yolks, and mixtures of whites and yolks in variant proportions. The term "egg liquid" is, therefore, used hereinafter in a generic sense to encompass liquid egg whites, liquid egg yolks, liquid whole eggs and mixtures of whites and yolks in various proportions.

The following examples are illustrative of the practice of the method on whole eggs and on egg yolks.

*Example 5*

To 2000 ml. of liquid whole eggs, there is added, with stirring, 4 ml. of 30% hydrogen peroxide and 6 ml. of the glucose oxidase-catalase preparation. A further addition of 4 ml. of 30% hydrogen peroxide is made after 15 minutes. At the end of 5 hours the free reducing sugar content is 0.18 mg./ml. To the resulting liquid egg product there are added 100 grams of glycerin and the mixture is then pan dried.

*Example 6*

To 5000 ml. of fresh liquid egg yolks, there is added, with stirring, 5 ml. of 30% hydrogen peroxide and 15 ml. of the glucose oxidase-catalase preparation. A further addition of 8 ml. of 30% hydrogen peroxide is made after 15 minutes. At the end of 4 hours the free reducing sugar is 0.2 mg./ml. To the resulting liquid egg yolks there are added 300 grams of glycerin and the mixture is then pan dried.

The sugar determinations were based on the methods disclosed in J. Biol Chem. 153, 375–380 (1944), and 160, 61–68; 69–73 (1945).

While the method of my present invention is applicable to the treatment of fresh or untreated egg liquid, it is, in general, preferred to subject the egg liquid, particularly the liquid egg whites, to a preliminary neutralizing treatment before subjection to the action of the glucose oxidase-catalase and oxidizing agent. Fresh liquid egg whites, for example, have a pH of about 9. It is usually advantageous if the fresh liquid egg whites are preliminarily acidified to produce a pH within the range of optimum activity of the particular glucose oxidase-catalase preparation used. In general, a pH of about 6.5 to 7.5, say 7.3 to 7.5, will be found to represent a good range of pH adjustment prior to the egg liquid being subjected to treatment in accordance with my invention. It will also be understood that pasteurizing, filtering and like steps, can be utilized in conjunction with the process of my invention. Thus, for example, the egg liquid can be pasteurized before or after treatment with the glucose oxidase-catalase and oxidizing agent, or both before and after such treatment. The drying step is carried out by pan drying or spray drying or other known drying procedures. Furthermore, before or after the oxidizing treatment and before drying, additions of various kinds can be made, as, for example, sucrose, monoglycerides of higher fatty acids, monostearin sulfoacetate, etc.

Various innocuous or non-toxic oxidizing agents can be used in the practice of my invention. Thus, for instance, oxygen, air, or other oxygen-containing gases can be employed; and peroxy compounds such as sodium peroxide, hydrogen peroxide, urea peroxide, sodium percarbonate, sodium perpyrophosphate and sodium persulfate are especially suitable. In general, the oxidizing agent or agents should be such as do not leave a residue or an objectionable residue in the egg product. Hydrogen peroxide is particularly satisfactory and, when it or similar peroxy compounds are utilized, a glucose oxidase having catalase activity as well, or a mixture of a glucose oxidase with a catalase preparation, is employed.

The proportions of glucose oxidase and oxidizing agent, in relation to the quantity of liquid egg product treated, are variable and are used in accordance with existing practices. The effectiveness or extent of activity of any particular glucose oxidase preparation and the purity of the glucose oxidase are, obviously, significant factors as is also the desideratum of speed of carrying out the process. Similar considerations apply to the oxidizing agent. In any event, the proportions are not critical although it will be understood that practical and economic considerations will govern the conditions under which this aspect of the method is carried out. Generally speaking, the proportions of glucose oxidase preparation and oxidizing agent are a distinctly minor percentage of the quantity of liquid egg product being treated or processed.

It will be understood that the length of time of treatment of the liquid egg products is somewhat variable, depending, among other things, upon the degree of activity of the glucose oxidase preparation employed, the proportions thereof utilized in relation to the amount of liquid egg product, the pH of the medium, the temperature of treatment, the degree of stirring or agitation, the type of oxidizing agent employed, and the exact results desired. Generally speaking, one desideratum is to complete the treatment in as short a period of time as possible. To this end, larger proportions of glucose oxidase speed up the process. Economic considerations, however, may dictate the utilization of somewhat longer treatment periods with the use of lesser proportions of glucose oxidase. Treatment periods may vary from about ½ hour to perhaps 8 to 10 hours or slightly more, with a good average in the neighborhood of 4 to 8 hours.

The term "glucose oxidase" is used in a generic sense to encompass oxidases which have the property of converting reducing sugars to their corresponding and lower acids, for example, glucose to gluconic acid, under conditions of oxidation. The term "glucose oxidase" is also intended to include the correspondingly functioning dehydrogenases, it being understood, in this connection, that in certain instances, at least, no line of demarcation has been drawn between an oxidase and a correspondingly functioning dehydrogenase. The glucose oxidases are derived from molds, bacteria and the like in accordance with known procedures, typical examples of such oxidases being penafin, notatin, and penicillin B. Various commercial glucose oxidase preparations are available on the market, one of which with which I have obtained good results being sold under the name "Deoxygenase." Another commercial glucose oxidase-catalase preparation is available under the name "Glucatase." The preparations are available in the form of a clear aqueous solution or as a powder and, in addition to possessing glucose oxidase activity, they also possess catalase activity. In this connection, it may be noted that glucose oxidase preparations which also possess other activities can be used in the practice of my invention so long as they have appreciable glucose oxidase properties.

As I have pointed out previously, the dried egg white products of my present invention are of especial utility in cake baking and they find a most important use in prepared or dry cake mixes, particularly those wherein the sugar content is high as, for instance, approaching or exceeding the amount of the flour. A typical example of such a prepared cake mix is as follows, the stated percentages being by weight:

| | Per cent |
|---|---|
| Cake flour | 43.4 |
| Baker's special sugar | 42.0 |
| Salt | 1.1 |
| Shortening ("high ratio" type) | 10.0 |
| Baking powder | 2.0 |
| Dried egg white[1] | 1.5 |

[1] Product made in accordance with present invention.

Prepared cake mixes, such as that of the above example, have unusually satisfactory shelf life in relation to the dried egg white constituent. Exceptionally satisfactory results are also obtained in relation to cake texture, color, volume and retention of volume and color on aging of the baked cakes.

What I claim as new and desire to protect by Letters Patent of the United States is:

1. In a process of preparing dried egg white products wherein liquid egg whites are processed by subjection thereof to oxidation in the presence of a glucose oxidase and catalase for a period sufficient to reduce the content of free reducing sugars therein to less than 50% of the normal content thereof, the step of improving the over-all whipping and baking properties of said egg whites which comprises adding a water-soluble aliphatic polyhydric alcohol to the aforesaid processed liquid egg whites and then drying the resulting mixture, the amount of said polyhydric alcohol utilized constituting from about 4% to about 22%, by weight, of the finished dried egg white products.

2. In a process of preparing dried egg white products wherein liquid egg whites are processed by subjection thereof to oxidation with an innocuous peroxy compound in the presence of a glucose oxidase and catalase for a period sufficient to reduce the content of free reducing sugars to not more than about 0.1%, based on the weight of the egg white solids, the step of improving the over-all whipping and baking properties of said dried egg whites which comprises adding a water-soluble aliphatic polyhydric alcohol to the aforesaid processed liquid egg whites and then drying the resulting mixture, the amount of said polyhydric alcohol utilized constituting from about 4% to about 22%, by weight, of the finished dried egg white products.

3. The process recited in claim 2 wherein said alcohol is glycerine.

4. The process recited in claim 2 wherein said alcohol is sorbitol.

5. In a process of preparing dried egg white products wherein liquid egg whites are processed by subjection thereof to oxidation with hydrogen peroxide in the presence of a glucose oxidase and catalase for a period sufficient to reduce the content of free reducing sugars to less than 50% of the normal content thereof, the step of improving the over-all whipping and baking properties of said dried egg whites which comprises adding glycerin to the aforesaid processed liquid egg whites and then drying the resulting mixture, the amount of glycerin utilized constituting from about 4% to about 22%, by weight, of the finished dried egg white products.

6. In a process of preparing egg white products wherein liquid egg white are processed by subjection thereof to oxidation with hydrogen peroxide in the presence of a glucose oxidase and catalase for a period sufficient to reduce the content of free reducing sugars to less than 50% of the normal content thereof; the step of improving the over-all whipping and baking properties of said egg whites which comprises adding a water-soluble aliphatic polyhydric alcohol to the aforesaid processed liquid egg whites in an amount constituting from about 4% to about 22%, by weight, of the total of the egg white solids and said polyhydric alcohol.

7. In a process of preparing dried egg white products wherein liquid egg whites are processed by subjection thereof to oxidation with an innocuous oxygen-containing gas in the presence of a glucose oxidase for a period sufficient to reduce the content of free reducing sugars to less than 50% of the normal content thereof, the step of improving the over-all whipping and baking properties of said dried egg whites which comprises adding glycerin to the aforesaid processed liquid egg whites and then drying the resulting mixture, the amount of glycerin utilized constituting from about 6% to about 10%, by weight, of the finished dried egg white products.

8. In a process of preparing egg products wherein egg liquid is processed by subjection thereof to oxidation in the presence of a glucose oxidase and catalase for a period sufficient to reduce the content of free reducing sugars therein to less than 50% of the normal content thereof, the step of improving the properties of said egg products which comprises adding a water-soluble aliphatic polyhydric alcohol to the aforesaid processed egg liquid in an amount constituting from about 4% to about 22%, by weight, of the total of the egg solids and said polyhydric alcohol.

9. The process recited in claim 8 wherein said alcohol is glycerine.

10. The process recited in claim 8 wherein said alcohol is sorbitol.

11. In a process of preparing dried egg products wherein egg liquid is processed by subjection thereof to oxidation with hydrogen peroxide in the presence of a glucose oxidase and catalase for a period sufficient to reduce the content of free reducing sugars to less than 50% of the normal content thereof, the step of improving the properties of said dried egg products which comprises adding glycerin to the aforesaid processed egg liquid and then drying the resulting mixture, the amount of glycerin utilized constituting from about 6% to about 10%, by weight, of the finished dried egg products.

12. In a process of preparing dried egg products wherein egg liquid is processed by subjection thereof to oxidation with an innocuous oxygen-containing gas in the presence of a glucose oxidase for a period sufficient to reduce the content of free reducing sugars to less than 50% of the normal content thereof, the step of improving the properties of said dried egg products which comprises adding glycerin to the aforesaid processed egg liquid and then drying the resulting mixture, the amount of glycerin utilized constituting from about 4% to about 22%, by weight, of the finished dried egg products.

References Cited in the file of this patent

UNITED STATES PATENTS

| | | |
|---|---|---|
| 1,951,889 | Tranin | Mar. 20, 1934 |
| 2,236,773 | Fischer | Apr. 1, 1941 |
| 2,427,726 | Hopkins et al. | Sept. 23, 1947 |
| 2,460,986 | Josh et al. | Feb. 8, 1949 |
| 2,610,918 | Kline et al. | Sept. 16, 1952 |